July 9, 1940.　　　　　　　M. BIK　　　　　　　2,206,936
AUTOMATIC CHANGE SPEED GEAR OF THE EPICYCLIC TYPE
Filed April 22, 1938　　　2 Sheets-Sheet 1
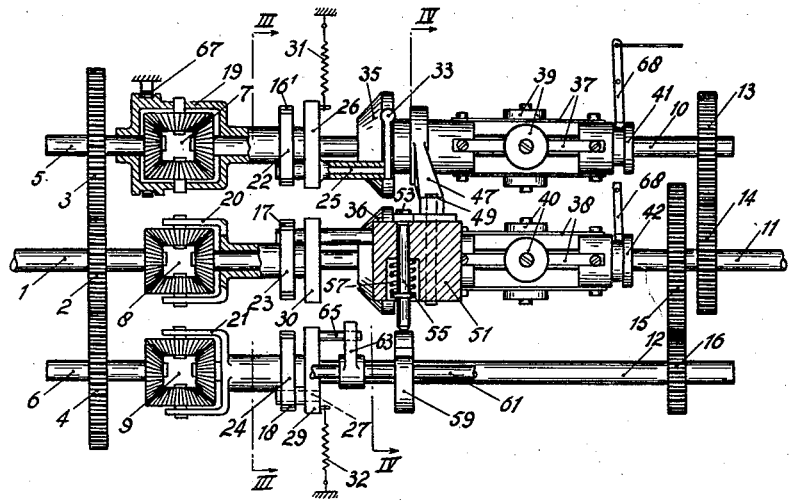
FIG:1
FIG:2
INVENTOR
Machiel Bik.
BY
Munn, Anderson & Liddy
ATTORNEYS.

FIG: 3
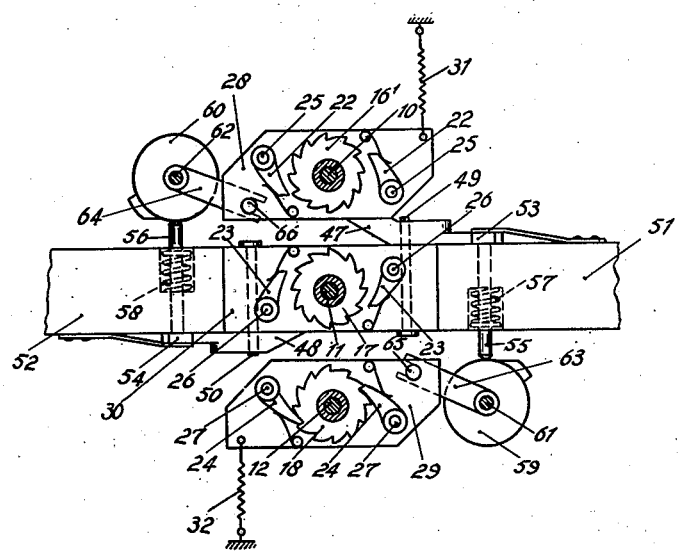
FIG: 4
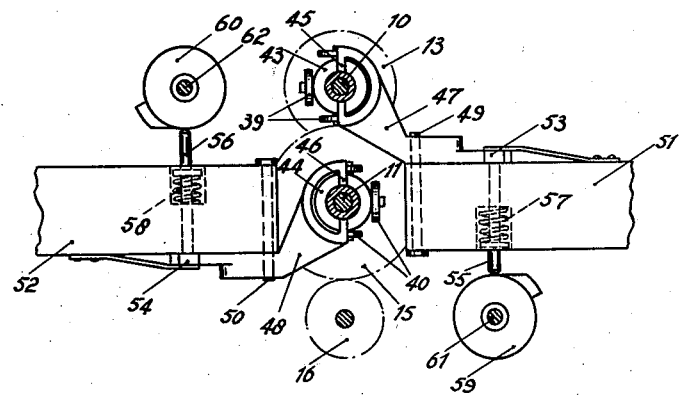
INVENTOR
Machiel Bik.

Patented July 9, 1940

UNITED STATES PATENT OFFICE 2,206,936

AUTOMATIC CHANGE SPEED GEAR OF THE EPICYCLIC TYPE

Machiel Bik, Johannesburg, Transvaal, Union of South Africa

Application April 22, 1938, Serial No. 203,697
In the Netherlands April 22, 1937

6 Claims. (Cl. 74—260)

The present invention relates to an improved automatically operating change speed gear of the type, in which the power transmission in each of the various speed ranges is effected through the medium of an epicyclic (differential) gear operating a countershaft, which through constant mesh gearing is coupled to the shaft to be driven and in which such power transmission is effected by arresting or braking the rotational movement of the planet wheel carrier of the particular differential gear.

The invention has for its object to provide a change speed gear of the kind referred to, in which the couple exerted by the planet wheel carrier of the differential gear of any momentarily operating speed range is caused to effect the gear changing operation by that such couple effects a displacement of an element against the action of a spring or other force, the return movement of such element during the diminishing of the couple upon effecting a decrease of the power load, causing the succeeding speed range, by arresting its planet wheel carrier, to be put into operation, dependent on the influence of a governor adapted to such speed range.

In this manner I have provided an automatic change speed gear, in which the speed changing operation is initiated by the driver of the vehicle by releasing the accelerator pedal (throttling the engine), the gear changing proper being effected by the mechanism itself.

According to a preferred embodiment of my invention the gear changing proper is effected, in that the return movement of the said element releases a member which is controlled by the said governor and which by its displacement under the influence of the force exerted by the governor, in its turn releases a loaded lever system enabling same to effect the gear changing.

Further objects of my invention will become apparent from the following description of the invention, reference being made to the accompanying drawings showing by way of example only a diagrammatical embodiment of my improved change speed gear.

Figure 1 is a side elevational view of the improved change speed gear, partly in section.

Fig. 2 is a plan view.

Fig. 3 is a cross sectional elevation on the line III—III in Fig. 1.

Fig. 4 is a similar view, taken on the line IV—IV in Fig. 1.

In these figures 1 represents the power shaft and 2 a spur gear wheel fixed to said shaft and meshing with two spur wheels 3 and 4 each having twice the number of teeth of the gear wheel 2, the said gear wheels 3 and 4 being keyed to shafts 5 and 6 respectively. 7, 8 and 9 represent three differential gears transmitting the power for the second, third and first speed ranges to shafts 10, 11 and 12, the shaft 11 carrying the load. Keyed to shaft 10 is a spur gear wheel 13 meshing with a gear wheel 14 on shaft 11 of the same number of teeth, the shaft 11 carrying a second spur gear wheel 15 meshing with a gear wheel 16 secured to shaft 12 and having half the number of teeth of the gear wheel 15.

$16^1$, 17 and 18 represent ratchet wheels, secured to an extension of each of the planet wheel carriers 19, 20 and 21 of the various differential gears. Co-operating with these ratchet wheels are spring urged pawls 22, 23 and 24 mounted on spindles 25, 26 and 27. The spindles of the pawls 22 and 24 are mounted in pawl carrying members 28 and 29 adapted to rock about the shafts 10 and 12 respectively. The spindle 26 of the pawls 23 is mounted in a stationary frame member 30. The pawl carrying members 28 and 29 are acted upon by a spring 31, 32, so that the same may perform a limited angular displacement with the planet wheel carriers.

The spindles 25, 26 of the pawls 22, 23 at their free ends are each provided with a laterally extending arm 33, 34 (34 not shown) having a rounded head, which under the influence of the springs acting upon the pawls are permanently pressed down upon a cone 35, 36 slidably but non-rotatably mounted on the shafts 10 and 11 respectively and normally so positioned that the rounded heads of the arms 33, 34 rest upon the widest part of the cones, thereby preventing the pawls from entering into engagement with the ratchet wheel teeth under the influence of their springs. The pawls 24 of the ratchet wheel 18, not being acted upon by a cone are of course permanently in engagement with the teeth of said ratchet wheel. If, as shown in the drawings, the pawls are double, the spindles of each set of pawls 22, 23 are of course coupled for joint movement, such coupling means being omitted for the sake of clearness. Forming part of each cone 35, 36 is a sleeve, to which are secured the blade springs 37, 38 of a governor of the known type, having weights 39, 40 secured to said springs and sleeves 41, 42 to which the free ends of the blade springs 37, 38 are attached and which are coupled to the shafts 10, 11 in circumferential direction but are secured against axial movement or may be axially displaced by means hereinafter to be described. To prevent breakage of the springs 37, 38 by excessive force the governors may be provided with a mantle (not shown) surrounding the weights at a certain distance and limiting their outward movement.

The sleeves of the cones 35, 36 are each provided with an annular groove 43, 44 receiving radial pins 45, 46 carried by an upwardly inclined arm of a lever 47, 48 pivoted at 49, 50 to the top of a frame member 51, 52, the free arm of said lever co-operating with a spring operated abutment 53, 54 as will be described further on. Slidably mounted within the said frame member 51, 52 is a pin 55, 56, normally pressed down by a spring 57, 58 upon the face of a cam 59, 60 mounted on an axis 61, 62. Mounted on each axis 61, 62 is a slotted crank arm 63, 64 embracing a pin 65, 66 secured in the pawl carrying members 28, 29.

The operation of the improved automatic change speed gear is as follows:

As the pawls 24 are permanently engaged, the mechanism, in the position of rest, is set for the first speed. When in this position the throttle valve of the engine is opened (the clutch being thrown in) the differential gear 9 is loaded, so that the planet wheel carrier 21 through the medium of the ratchet wheel 18 and the pawls 24 will cause an angular displacement of the pawl carrying member 29 against the action of the spring 32. This causes a part rotation of the slotted arm 63 and thus of the axis 61 and the cam 59, so that the pin 55 is raised against the action of the spring 57. The upper end of the pin 55 thereby engages the abutment 53 and lifts same out of the path of the free arm of the lever 47, so that this lever is free to be moved about its pivot 49 by the force exerted by the governor weights 39 upon the sleeve of the cone 35, which governor is permanently driven through the constant mesh gear wheels 13—16. However, as the abutment 53 is replaced by the end of the pin 55 projecting from the frame member 51, the lever 47 is allowed a limited movement only, the pin 55 preventing further movement of the lever arm, which in this position is partly moved beneath the abutment 53. If in this position the throttle pedal is released, thereby removing the load from the differential 9, the member 29 is rotated backwards by the spring 32, thereby releasing the pin 55, which by the spring 57 is retracted, so that the lever 47 is free to move and if at this moment the speed of the engine in the first speed range is sufficient to allow shifting to the second speed range, the particular governor will slide the cone 35 relative to the arm 33 of the pawl spindle 25 in a direction (to the right) which permits the arm 33 to drop thereby enabling the pawls 22 to enter into engagement with the teeth of the ratchet wheel 16¹ under the influence of their springs. This puts the second speed range into operation, so that upon again throwing in the throttle pedal the power is transmitted to the shaft 11 through the differential gear 7 and gears 13, 14. It will be understood that the movement of the lever 47 should not be sufficient to carry the free arm of said lever completely past the spring actuated abutment 53, as otherwise the lever would be prevented from returning to its initial position when changing back from first to second speed. The ratchet wheel 18, i. e. the planet wheel carrier of the first speed range at this time is driven in a direction opposite to that in which it was rotated when the first speed range was in operation, as will become apparent from the following reasoning. If e. g. the power shaft 1 makes $n$ revolutions the gear wheel 3 and therefore the sun wheel of the differential gear 7 carried by shaft 5, makes ½ $n$ revolutions in opposite direction of the power shaft and the shaft 10 ½ $n$ revolutions in the same direction as the shaft 1. Therefore the shaft 12 and the sun wheel carried thereby makes $n$ revolutions in the same direction as the shaft 1, being driven from 10 through 13, 14, 15 and 16. The sun wheel on shaft 6 makes ½ $n$ revolutions in opposite direction of the power shaft, so that the planet wheel carrier makes ¼ $n$ revolutions in the direction of shaft 1. In the first speed range, the planet wheel carrier of the differential gear 9, however, was urged in a direction opposite to the power shaft, so that in the second speed range, the pawls 24 will slip over the teeth of the ratchet wheel 18. Therefore the throttle pedal may be again depressed to accelerate the vehicle to the third speed.

This causes the planet wheel carrier of the differential gear 7 to exert a couple which through the medium of pawl carrying member 28, slotted arm 64 (Fig. 3) and cam 60 causes the pin 56 to remove abutment 54 from the path of lever 48, which thereupon is drawn against the projecting end of pin 56 by the force exerted by the weights 40 of the second governor, of which the springs 38 are dimensioned in conformity with the speed, required for changing to the third speed.

To change from second to third, the throttle pedal is again released, causing member 28 to turn back, thereby enabling spring 58 to retract pin 56 so as to release lever 48 and to enable the governor of the third speed range to shift the cone 36 (to the right in Fig. 1), causing the pawls 23 to engage the teeth of ratchet wheel 17. To put in the third speed the throttle pedal is again pressed down. In the third speed range the pawls 22 will slip the teeth of ratchet wheel 16¹ for the same reason as stated above with reference to the pawls 24.

If the motor vehicle reaches a steep incline and is driven on second speed, it may be necessary to change to first speed range. To obtain this the throttle pedal is momentarily released. The governor of the second speed range normally tends to stretch its spring 37 since the speed decreases. This, however, is prevented by the pawls 22 which are held by the teeth of ratchet wheel 16¹. However, as soon as the throttle pedal is released, the springs 37 are free to stretch, thereby pushing cone 35 to the left (in Figure 1) which causes the pawls 22 to be disengaged. Upon again opening the throttle valve of the engine the planet wheel carrier of the differential gear 9 is arrested by the permanently engaged pawls 24 and the transmission is changed to first speed. Changing down from third to second speed is effected in the same manner as from second to first, as in the third speed range pawls 22 remain engaged and therefore are ready to arrest planet wheel carrier 19.

It will be understood that in speeding up, the third speed can not be obtained, before the pawl carrying member 28 is angularly displaced, i. e. before the second speed range has been in operation. The exigence, that in speeding up the second speed range may not be skipped, is thereby fulfilled. If the vehicle travels on third speed and has to be stopped suddenly, the springs of both governors tend to stretch, so that since the throttle pedal is released, pawls 22 and 23 are disengaged. The gear box therefore is ready for being again started on first speed as it should be. It may be observed, that in starting the engine, the declutching pedal should be pressed down. I therefore proposed to so couple the hand brake with the declutching pedal, that when the hand brake is applied, the clutch is disengaged. This construction is old and has been used years ago in Ford automobiles.

I have found that the operation of speeding up does not cause shocks on the pawls upon engagement. This may be explained as follows: If the vehicle travels on the first speed range with sufficient speed to change to second speed range, the throttle pedal is released. The engine then runs under its own power, the vehicle keeps running and free-wheels, the pawls 24 slip. Assuming that at the moment the pedal is released, the shaft 11 makes one thousand revolutions, it will keep this speed after the pedal has been released. The power shaft 1, however, decreases its number of revolutions to, say, 100, as the engine runs free. In the same manner as the pawls 24 slip on ratchet wheel 18, the pawls 22 upon being pressed down, will slip momentarily on ratchet wheel 16¹, so that upon again depressing the throttle pedal, the pawls will engage without any shock. That the engine upon release of the pedal immediately diminishes its number of revolutions, is of course owing to the compression. Speeding down always occurs without shock as the pawls of a lower speed range are always engaged.

The reverse has not been shown in the drawings, as I may use any known construction for this purpose, which has nothing to do with my present invention.

As appears from the above the improved change speed gear includes a free wheel. This prevents the engine from being used to brake the vehicle when descending a decline. In connection therewith I may provide means for removing this drawback, which adheres to all automatic change speed gears. I therefore provide a manually operated brake 67 (Fig. 1) by means of which the driver, when descending a steep decline, may arrest the planet wheel carrier 19 of the differential gear 7, so that the engine acts as a brake. At the same time the pawls 23 of the third speed range have to be disengaged, as it is impossible to have the second and third range engaged simultaneously. That it is practically impossible to design a full automatic change speed gear, which when the vehicle runs down a steep decline, automatically changes to a lower speed range, appears from the fact that the vehicle should decrease its speed, if the mechanism is to come down to second speed range; the vehicle, however, is accelerated. The driver therefore will always have to intervene, which is no objection. Many up-to-date motor cars have a free-wheel, which has to be put out in order to use the engine for braking the vehicle. The hand operated brake in the present case, therefore is not derogatory to the novel construction.

Finally the case is to be considered, that when driving e. g. on the third speed range, with a velocity of say 50 km./h. the vehicle has to be braked very suddenly with such a force that the rear wheels are locked, but that immediately thereupon the car may proceed and the speed of the car has not decreased below say 15 km./h. The gear box should then be in the second speed. This requires certain additional measures, which I shall state below, since with the construction so far described, this would not be possible. When the rear wheels are locked, both governors are also completely at rest, so that the pawls 22 and 23 would be disengaged and the gear box would be in the first speed range. This is inconvenient. I therefore propose to make the sleeves 41, 42 of the governors axially slidable on the shafts 10 and 11 respectively and to provide means, as for example a handle 68 connected by a simple lever system to the brake pedal, for automatically shifting said sleeves (to the right in Fig. 1) over a distance, equal to the distance over which the cones 35, 36 would be displaced under the stretching force of the governor springs, if the sleeves 41, 42 were locked against axial movement. If therefore upon applying the brakes, the governors are arrested, even the complete stretching of the governor springs will not effect the cones, but will be taken up by the displacement of the sleeves 41, 42, so that the pawls 22, 23 will not be disengaged. When subsequently the brake pedal is again released, assuming the vehicle to travel with the above said speed of 15 km./h., the sleeves 41, 42 are indeed moved to the left, but the governor on shaft 10 will then again have the number of revolutions required for holding the cone 35 in its retracted position, in which the pawls 22 are engaged, so that the mechanism will be in the second speed range. The governor on shaft 11, at this speed, however, is not able to hold the cone 36 in its retracted position, so that the pawls 23 will be disengaged. The same reasoning holds for the case that the speed does not decrease below, say, 40 km./h., in which case the third speed range remains intact.

It will be understood that the invention is not limited to the particular embodiment above described and shown in the drawings, but that various alterations are possible within the scope of the appending claims.

What I claim is:

1. An automatic change speed gear comprising a power shaft subject to an increase and decrease in its driving moment, a primary gear train operated by said power shaft, a plurality of primary driven shafts coupled to said primary gear train, a planetary gear for said power shaft and each of said primary driven shafts, an identical element of each planetary gear being coupled to the load shaft, respectively the respective primary driven shaft, a second identical element of the respective planetary gear being coupled to a load shaft respectively to a respective secondary driven shaft, a secondary gear train coupling said secondary driven shafts to said load shaft, means for arresting the remaining element of each respective planetary gear thereby to enable the respective primary and secondary driven shaft and the respective planetary gear to transmit power from said power shaft to said load shaft through the respective elements of said primary and secondary gear trains at the respective speed range, respectively to enable the power shaft to transmit power to the load shaft through its planetary gear directly, said arresting means of said planetary gears being embodied in a respective movable member having a respective yieldable holding means tending to hold the respective movable member in a set position, said movable member being subject to a limited forward movement against the action of said holding means upon a small but sufficient load moment in said load shaft, and being subject to a return movement by the action of its yieldable holding means upon the vanishing of said load moment in the said load shaft, said return movement releasing a normally blocked member acted upon by a governor responsive to the respective succeeding speed range, the release of such member permitting said governor to arrest the said remaining element of the planetary gear of the respective succeeding speed range, thereby to create the possibility of transmitting power at said succeeding speed range from said power shaft to said load shaft through the respective planetary gear, the respective primary and secondary driven shaft and the respective elements of said primary and secondary gear trains or directly, the releasing of said governor operated member being such as to enable the governor to return said member to its blocked position at the respective speed range.

2. An automatic change speed gear comprising a power shaft, subject to an increase and decrease in its driving moment, a primary gear train operated by said power shaft, a plurality of primary driven shafts coupled to said primary gear train, a planetary gear for said power shaft and each of said primary driven shafts, an identical element of each planetary gear being coupled to the load shaft, respectively the respective primary driven shaft, a second identical element of the respective planetary gear being coupled to a load shaft respectively to a respective secondary driven shaft, a secondary gear train coupling said secondary driven shafts to said load shaft, means for arresting the remaining element of each respective planetary gear thereby to enable the respective primary and secondary driven shaft and the respective planetary gear to transmit power from said power shaft to said load shaft through the respective elements of said primary and secondary gear trains at the respective speed range, respectively to enable the power shaft to transmit power to the load shaft through its planetary gear directly, said arresting means of said planetary gears being embodied in a respective movable member having a respective yieldable holding means tending to hold the respective movable member in a set position, said movable member being subject to a limited forward movement against the action of said holding means upon a small but sufficient load moment in said load shaft, and being subject to a return movement by the action of its yieldable holding means upon the vanishing of said load moment in the said load shaft, a governor responsive to each succeeding speed range, a lever connected at one end to said respective governor for being shafted thereby, a primary abutment in the path of the other end of said lever to normally block said shifting, a secondary abutment adapted to remove the primary abutment and to take its place in the path of the respective lever by the forward movement of the said movable member, such secondary abutment being removed by the return movement of said movable member thereby permitting the respective governor to arrest the remaining element of the planetary gear of the succeeding speed range.

3. An aromatic change speed gear comprising a power shaft and a load shaft, a plurality of primary driven shafts, a primary gear train coupling said primary driven shafts to said power shaft, a plurality of secondary driven shafts, a secondary gear train coupling said secondary driven shafts to said load shaft, a planetary gear interposed between each primary and secondary driven shaft, respectively between said power shaft and said load shaft an identical element of each planetary gear being coupled to the respective primary driven shaft respectively the power shaft, a second identical element of each planetary gear being coupled to the respective secondary driven shaft respectively the load shaft, such primary and secondary driven shafts and such power shaft and load shaft with their respective planetary gears respectively representing successively higher speed ranges, the remaining element of each respective planetary gear having a ratchet wheel associated therewith, pawls for said ratchet wheels, such pawls being pivotally mounted on a respective carrying member associated with each speed range, the pawl of the first speed range being in permanent engagement with the respective ratchet wheel, said carrying members except that of the last speed range, being rockably mounted, yieldable means for the respective rockable members for holding same in a set position, such respective rockable members, being subject to a forward displacement through a limited angle against the action of said respective holding means upon a load moment in said load shaft and being subject to a return movement through said angle by the action of said holding means upon the vanishing of said load moment, a fixed carrying member for the last speed pawl, a governor for the second and further speed ranges, being responsive to the respective speeds, means acted upon by each governor, for holding the pawls of the second and further speed ranges in normal disengagement from the respective ratchet wheels and a lever associated with each governor so as to be shifted thereby, such lever being normally blocked and being released by the return movement of the said respective rockable member to permit the displacement of the respective pawl holding means by the respective governor for the engagement of the respective pawl and ratchet wheel.

4. In an automatic change speed gear, a rockable member adapted to partake of angular displacement and return movements, a lever, a governor adapted to act on one end of the lever for the shifting of said lever, a primary abutment in the path of the other end of said lever to normally block said shifting, and a secondary abutment adapted to remove the primary abutment by the angular displacement of said member and to take its place in the path of the respective lever and at the return movement of said member, thereby to permit a limited shifting of said lever.

5. In an automatic change speed gear, a governor which is responsive to a determined speed of rotation, a cone coupled to the governor and being axially movable thereby, a spring-pressed pawl, a ratchet wheel adapted to be engaged by the pawl under pressure of its spring, and an arm connected to the pawl initially resting on the crown of the cone, but movable down the cone by spring-action upon operation of the governor to cause the engagement of the pawl and ratchet wheel.

6. In a motor vehicle having a brake pedal, an automatic change speed gear incorporated in said vehicle, a ratchet wheel and pawl adapted to be in engagement during a predetermined speed of said gear, a governor responsive to said speed, governor-controlled means assuming a retracted position during said governor speed to maintain said pawl in engagement with the ratchet wheel during the respective speed range, and means operably connected between the brake pedal and governor, acting on the governor upon operation of the brake pedal to prevent the governor-controlled means from departing said retracted position.

MACHIEL BIK.